(12) United States Patent
Zheng et al.

(10) Patent No.: US 8,504,529 B1
(45) Date of Patent: Aug. 6, 2013

(54) SYSTEM AND METHOD FOR RESTORING DATA TO A STORAGE DEVICE BASED ON A BACKUP IMAGE

(75) Inventors: Ling Zheng, Saratoga, CA (US); Hsing Yuan, Palo Alto, CA (US)

(73) Assignee: NetApp, Inc., Sunnyvale, CA (US)

( * ) Notice: Subject to any disclaimer, the term of this patent is extended or adjusted under 35 U.S.C. 154(b) by 302 days.

(21) Appl. No.: 12/488,468

(22) Filed: Jun. 19, 2009

(51) Int. Cl.
*G06F 7/00* (2006.01)
*G06F 17/00* (2006.01)

(52) U.S. Cl.
USPC .......................................... 707/679; 707/686

(58) Field of Classification Search
USPC ................................. 707/679, 999.202, 686
See application file for complete search history.

(56) References Cited

U.S. PATENT DOCUMENTS

| | | | |
|---|---|---|---|
| 5,642,505 A | 6/1997 | Fushimi | |
| 5,859,972 A | 1/1999 | Subramaniam et al. | |
| 5,956,725 A | 9/1999 | Burroughs et al. | |
| 5,983,324 A | 11/1999 | Ukai et al. | |
| 6,289,356 B1 | 9/2001 | Hitz et al. | |
| 6,983,296 B1 | 1/2006 | Muhlestein et al. | |
| 6,993,539 B2 | 1/2006 | Federwisch et al. | |
| 7,143,307 B1 | 11/2006 | Witte et al. | |
| 7,200,726 B1 | 4/2007 | Gole et al. | |
| 7,409,494 B2 | 8/2008 | Edwards et al. | |
| 7,555,620 B1 | 6/2009 | Manley | |
| 7,631,159 B1 | 12/2009 | Krishnamurthy | |
| 7,681,069 B1 | 3/2010 | Chellappa et al. | |
| 7,694,088 B1 | 4/2010 | Bromley et al. | |
| 7,743,028 B1 | 6/2010 | Stringham et al. | |
| 7,809,692 B1 | 10/2010 | Pruthi et al. | |
| 8,126,847 B1 | 2/2012 | Zheng et al. | |
| 8,190,836 B1 | 5/2012 | Zheng et al. | |
| 8,200,638 B1 | 6/2012 | Zheng et al. | |
| 2002/0133491 A1* | 9/2002 | Sim et al. | 707/999.01 |
| 2003/0093439 A1 | 5/2003 | Mogi et al. | |
| 2003/0182502 A1 | 9/2003 | Kleiman et al. | |
| 2004/0030668 A1 | 2/2004 | Pawlowski et al. | |
| 2004/0221125 A1 | 11/2004 | Ananthanarayanan et al. | |
| 2005/0246382 A1* | 11/2005 | Edwards | 707/999.2 |
| 2006/0143238 A1 | 6/2006 | Tamatsu | |
| 2006/0155775 A1 | 7/2006 | Yamasaki | |
| 2006/0218561 A1* | 9/2006 | Moir et al. | 719/316 |

(Continued)

FOREIGN PATENT DOCUMENTS

WO    WO-2005048085 A2    5/2005

OTHER PUBLICATIONS

Final Office Action mailed Feb. 17, 2011 in Co-pending U.S. Appl. No. 12/113,049, filed Apr. 30, 2008.

(Continued)

*Primary Examiner* — Apu Mofiz
*Assistant Examiner* — Bryan Walker
(74) *Attorney, Agent, or Firm* — Perkins Coie LLP

(57) ABSTRACT

A system for restoring data to a storage server generates a lookup data structure based on a backup image, where the lookup data structure defines a correspondence between individual block identifiers and individual data blocks of a plurality of data blocks in the backup image. The system then generates a directory structure on the storage server based on the backup image. After generating the directory structure, the system generates an empty restored file in the directory structure based on the backup image. The system then populates file contents of the restored file based on the lookup data structure.

26 Claims, 13 Drawing Sheets

U.S. PATENT DOCUMENTS

| | | | |
|---|---|---|---|
| 2006/0225065 | A1 | 10/2006 | Chandhok et al. |
| 2007/0043790 | A1 | 2/2007 | Kryger |
| 2007/0162515 | A1* | 7/2007 | Sarma et al. ........... 707/999.201 |
| 2007/0266056 | A1 | 11/2007 | Stacey et al. |
| 2007/0266066 | A1 | 11/2007 | Kapoor et al. |
| 2008/0077762 | A1 | 3/2008 | Scott et al. |
| 2008/0133828 | A1 | 6/2008 | Saito |
| 2008/0243958 | A1 | 10/2008 | Prahlad et al. |
| 2009/0019362 | A1 | 1/2009 | Shprigel et al. |
| 2009/0043828 | A1 | 2/2009 | Shitomi |
| 2009/0112703 | A1 | 4/2009 | Brown |
| 2009/0125701 | A1 | 5/2009 | Suponau et al. |
| 2009/0313503 | A1 | 12/2009 | Atluri et al. |
| 2010/0077160 | A1 | 3/2010 | Liu et al. |
| 2010/0100528 | A1 | 4/2010 | Brockway et al. |

OTHER PUBLICATIONS

Non-Final Office Action Mailed Nov. 11, 2010 in Co-Pending U.S. Appl. No. 11/963,473, filed Dec. 21, 2007.
Final Office Action Mailed Feb. 1, 2011 in Co-pending U.S. Appl. No. 12/113,060, filed Apr. 30, 2008.
Co-pending U.S. Appl. No. 12/871,778, filed Aug. 30, 2010.
Non-Final Office Action Mailed Aug. 18, 2010 in Co-pending U.S. Appl. No. 12/113,060, filed Apr. 30, 2008.
Non-Final Office Action Mailed Oct. 6, 2010 in Co-pending U.S. Appl. No. 12/113,060, filed Apr. 30, 2008.
Co-pending U.S. Appl. No. 11/963,473, filed Dec. 21, 2007.
Co-pending U.S. Appl. No. 12/391,842, filed Feb. 24, 2009.
Co-pending U.S. Appl. No. 12/391,849, filed Feb. 24, 2009.
Co-pending U.S. Appl. No. 12/113,060, filed Apr. 30, 2008.
Non-Final Office Action Mailed May 11, 2010 in Co-Pending U.S. Appl. No. 11/963,473, filed Dec. 21, 2007.
Non-Final Office Action Mailed Oct. 6, 2010 in Co-pending U.S. Appl. No. 12/113,049, filed Apr. 30, 2008.
Non-Final Office Action Mailed Dec. 8, 2011 in Co-Pending U.S. Appl. No. 11/963,473 of Mukherjee, S., filed Dec. 21, 2007.
International Search Report PCT/US2008/087661 dated Jun. 26, 2009; pp. 1-3.
Written Opinion PCT/US2008/087661 dated Jun. 26, 2009; pp. 1-4.
Non-Final Office Action Mailed Oct. 11, 2011 in Co-pending U.S. Appl. No. 12/391,849 of Zheng, L., et al., filed Feb. 24, 2009.
Non-Final Office Action Mailed Oct. 14, 2011 in Co-pending U.S. Appl. No. 12/391,842 of Zheng, L., et al.,filed Feb. 24, 2009.
Co-pending U.S. Appl. No. 12/113,049 of Zheng, L., et al., filed Apr. 30, 2008.
Final Office Action Mailed Nov. 17, 2010 in Co-Pending U.S. Appl. No. 11/963,473 of Mukherjee, S., filed Dec. 21, 2007.
Notice of Allowance Mailed Oct. 26, 2011 in Co-pending U.S. Appl. No. 12/113,060 of Zheng, L., et al., filed Apr. 30, 2008.
Notice of Allowance Mailed Jan. 30, 2012 in Co-pending U.S. Appl. No. 12/113,049 of Zheng, L., et al., filed Apr. 30, 2008.
Notice of Allowance Mailed Apr. 4, 2012 in Co-Pending U.S. Appl. No. 12/391,842 of Zheng, L., et al. filed Feb. 24, 2009.
Final Office Action Mailed Feb. 1, 2011 in Co-pending U.S. Appl. No. 12/113,060 of Zheng, L., et al., filed Apr. 30, 2008.
Notice of Allowance Mailed Jul. 21, 2011 in Co-pending U.S. Appl. No. 12/113,060 of Zheng, L., et al., filed Apr. 30, 2008.
Supplemental Notice of Allowability Mailed May 1, 2012 in Co-Pending U.S. Appl. No. 12/391,842 of Zheng, L., et al., filed Feb. 24, 2009.
Final Office Action Mailed Jun. 20, 2012 in Co-pending U.S. Appl. No. 12/391,849 of Zheng, L., et al., filed Feb. 24, 2009.
Non-Final Office Action Mailed Jun. 28, 2012 in Co-Pending U.S. Appl. No. 12/871,778 of Manjeshwar, C., et al., filed Aug. 30, 2010.
Tomi Hakala, "VMware Data Recover, file level restores", Aug. 28, 2009, http://v-reality.info/2009/08/vmware-data-recovery-file-level-restores/, pp. 1-3.
Vmware, "Vmware Data Recovery 1.0 Evaluator's Guide", Jul. 30, 2009, vmware, pp. 1-24.
Non-Final Office Action Mailed Jul. 26, 2012 in Co-Pending U.S. Appl. No. 11/963,473 of Mukherjee, S., filed Dec. 21, 2007.
Advisory Action Mailed Sep. 7, 2012 in Co-pending U.S. Appl. No. 12/391,849 of Zheng, L., et al., filed Feb. 24, 2009.
Final Office Action Mailed Oct. 26, 2012 in Co-Pending U.S. Appl. No. 12/871,778 of Manjeshwar, C., et al., filed Aug. 30, 2010.
Advisory Action Mailed Jan. 2, 2013 in Co-Pending U.S. Appl. No. 12/871,778 of Manjeshwar, C., et al., filed Aug. 30, 2010.
Non-Final Office Action Mailed Feb. 4, 2013 in Co-pending U.S. Appl. No. 12/391,849 of Zheng, L., et al., filed Feb. 24, 2009.
Final Office Action Mailed Mar. 20, 2013 in Co-Pending U.S. Appl. No. 11/963,473 of Mukherjee, S., filed Dec. 21, 2007.

* cited by examiner

| DATA BLOCK | METADATA BLOCK | METADATA BLOCK | ... | DATA BLOCK | DATA BLOCK | METADATA BLOCK | DATA BLOCK |

BACKUP IMAGE 400

*FIG. 4A*

| DATA BLOCK | DATA BLOCK | ... | DATA BLOCK | METADATA BLOCK | METADATA BLOCK | ... | METADATA BLOCK |

DATA WAREHOUSE 401  METADATA MAP 402

BACKUP IMAGE 410

*FIG. 4B*

SYSTEM AND METHOD FOR RESTORING DATA TO A STORAGE DEVICE BASED ON A BACKUP IMAGE

BACKGROUND

Conventionally, files and directories in a storage subsystem can be backed up with file-level operations. File-level backups yield individual files and directories on backup storage (e.g., tapes) by traversing a file system, which typically employs hierarchical storage structures. File-level backup techniques backup data on a file-by-file basis, because a file is the smallest addressable unit of data that the backup software can handle. File-level backup techniques and protocols generally have limited backup performance due to various file system overheads.

For example, a file system may support deduplication, which is a process in which the file system eliminates redundant data blocks in order to reduce the amount of storage space consumed by its stored data. A "block," in this context, is the smallest amount of contiguous data that can be addressed by a file system. A file is formed of one or more blocks. In a deduplicated storage system, a single copy of a data block is retained, while the redundant copies are replaced by references to the retained copy. In a file-level backup, the deduplication process is reversed, as the file-level backup system copies individual files to the backup storage without regard to the underlying configuration of the data in the file system. Thus, a file-level backup of a deduplicated system consumes significantly more space on a backup tape than the original data consumed on the storage subsystem.

Further, with file-level backup techniques, the files often have to be backed up in a certain order, such as inode based ordering and directory tree based ordering. For each file, file-level backup techniques have to backup the data from the beginning to the end (i.e., based on the order of the data within the file). The constraints imposed by the ordering requirements limit backup performance. For example, the dump format of Berkeley Software Distribution (BSD) UNIX further imposes strict ordering constraints among files, as well as among data blocks of a file.

In addition, file-level backups do not preserve metadata used by the storage system. Although a restore operation will restore user data, it cannot restore the metadata in the original volume. Loss of the metadata may result in the loss of the functionality that users may have had on the original volume.

An alternative method for backing up a storage system is block-level backup, also called image-based backup. Block-level backup techniques generally allow for better performance than file-level backups. A block-level backup creates a backup image in a backup storage facility by using data blocks as the smallest addressable unit of the backup software, rather than files. In general, these techniques are faster to execute, because the backup system does not need to interact with the file system to generate the backup. The backup image can be quickly restored because the restore system can simply copy each data block to the correct position on the storage volume without executing file system operations. However, block-level restores are also limited, because the restore can only be carried out if the storage server is using the same version of the file system as the original backup. If the file system is upgraded, aspects of the new file system (e.g. file or directory metadata configuration) may not be compatible with the backup image. Thus, it would be useful to have a backup system that provides the advantages of block-level backup, such as retaining deduplication, while also being compatible with upgraded or modified file system software.

SUMMARY

The present disclosure is directed to a system and method for restoring a backup image to a storage device. The system executes a block-level restore to copy data blocks from the backup image to the storage device. The system uses file system metadata in the backup image to generate a lookup data structure that defines a correspondence between the restored data blocks and a set of block identifiers. In some embodiments, the lookup data structure is implemented using a data warehouse file in the storage device's file system. The system then generates a directory and file structure on the storage device based on the file system metadata. The generated structure includes a set of empty files defined in the file system metadata. The system then populates file contents of the empty files using the file system metadata and the lookup data structure. In particular, the system uses file block lists in the file system metadata to determine a set of block identifiers associated with each of the files. The system then uses each block identifier as an index into the lookup data structure to retrieve the set of restored blocks associated with each file.

By generating directory and file data containers in the new file system, the restore system avoids the compatibility problems caused by a purely block-level restore solution. At the same time, unlike purely file-based backup system, the restore system is able to take advantage of data-block level optimizations, such as deduplication. First, the system can restore all data at once during a single read of the backup image, since the data can be restored to the storage device in the order is was stored in the backup regardless of any higher-level structures (e.g. files) associated with the blocks. This is particularly advantageous for tape backups, which are sequential-access media, meaning that data can be read faster when the data is physically contiguous (in contrast to data on a hard disk, where access time is nearly constant, regardless of physical proximity). In addition, using the lookup data structure ensures that deduplication is retained, because the system can track all restored data blocks and easily find the data block corresponding to a block reference in the file block list. In particular, a lookup structure using a data warehouse file allows for particularly fast restores because the file system is optimized to do that exact type of lookup.

BRIEF DESCRIPTION OF THE DRAWINGS

FIGS. 4A-4C illustrate examples of the format of a backup image.

DETAILED DESCRIPTION

Figure 1:
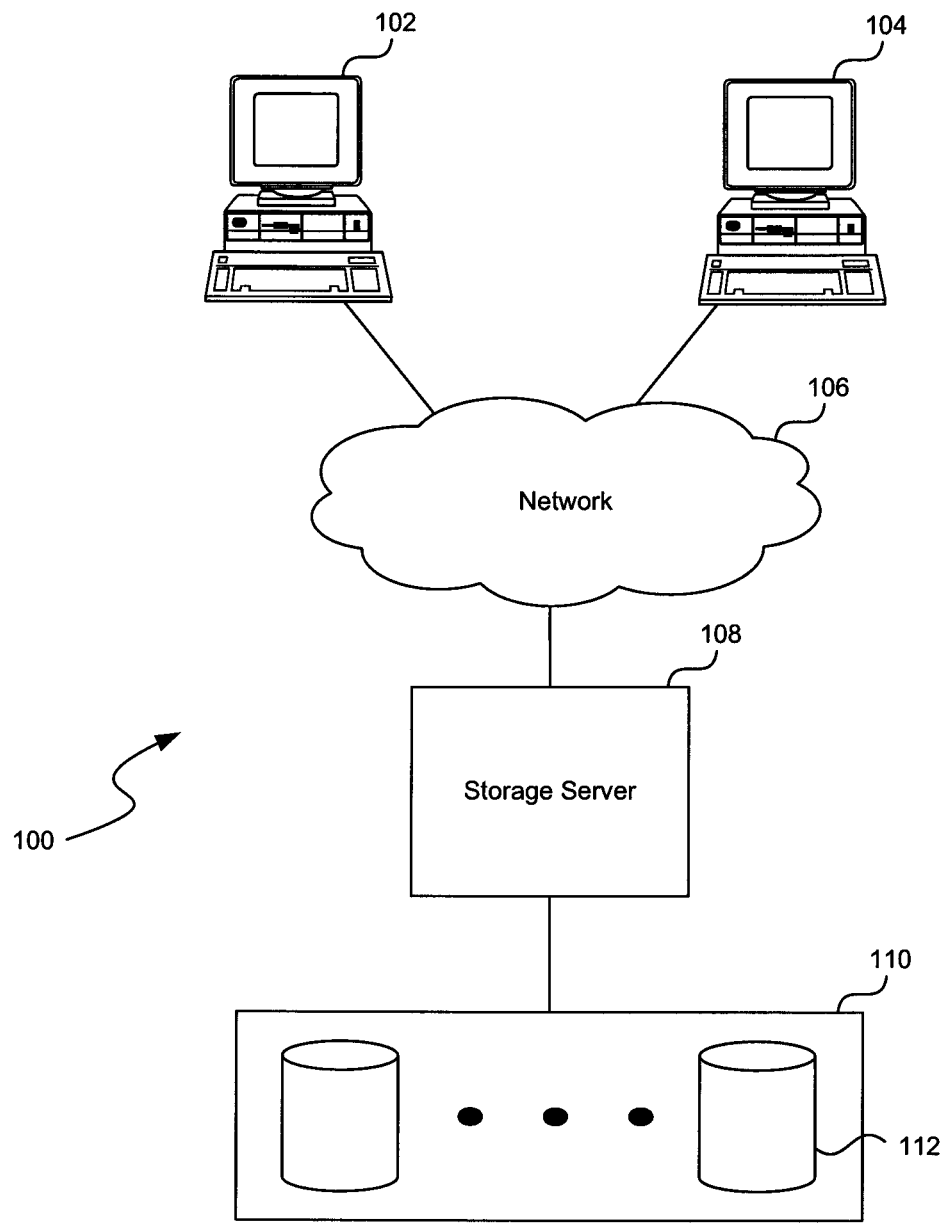
FIG. 1 illustrates a network environment which includes a storage server coupled to a storage subsystem.

A system for restoring a backup from a backup image to a storage device that provides the benefits of file-level and block-level techniques is disclosed (hereinafter called "the restore system" or "the system"). The backup image includes a data warehouse section, which stores data blocks from the backed-up storage device, and a metadata map section, which stores file system metadata corresponding to the data in the data warehouse. The file system metadata can include, for example, file and directory access permissions, directory hierarchy information, and lists of data blocks associated with individual files (referred to as "file block lists"). During the backup, the system performs an initial block-level restore by copying the data blocks from the backup image to the storage device. The system then generates a lookup structure on the storage device that defines a correspondence between the restored data blocks and block identifiers stored in the metadata map section. In some embodiments, the lookup structure is implemented as a data warehouse file. The data warehouse file includes references to each restored data block and orders the individual data blocks so that the each block's associated block identifier is equal to a block number corresponding to the data block's position in the file. After generating the lookup structure, the system controls the file system to generate a directory structure and empty files based on the file system metadata. The empty files include the metadata associated with each file, but do not include references to data blocks associated with those files.

The system then populates the data for each of the empty files using information from the file system metadata, such as the file block lists. The system uses the metadata to determine a set of block identifiers associated with the file and then uses the lookup structure to determine the restored data blocks that correspond to the block identifiers. The lookup structure ensures that each file is populated with the correct data blocks, even if the data blocks on the storage device are in different locations than on the original device. The lookup structure also ensures that deduplicated blocks are correctly referenced and are not repeated during the restore process. Similarly, the system supports restoring from an incremental backup by modifying the lookup structure based on the incremental backup and modifying the associated files based on an updated metadata map and the changes to the lookup structure.

In general, image-based (block-level) data restoration restores data of a volume from one or more backup images that are created by one or more image-based backup operations. The backup image is designed to support time-efficient backup operations as well as space-efficient backup storage. With respect to time efficiency, the data blocks can be stored without any ordering constraints imposed on the data blocks. With respect to space efficiency, all of the in-use data blocks in a volume (the term "volume" will be explained in greater detail below) are backed up without duplicating common data blocks. Further, the data blocks and metadata of the data blocks are read and stored with low-level disk I/O operations that incur minimal overhead, without using file system operations (illustratively, file open, directory read, etc).

Image-based data restoration as described herein can concurrently support several restore modes, as described further below. The restore modes include an image restore mode and a logical restore mode. In one embodiment, the image restore mode supports restoration of an entire image of the volume and is file system version dependent; whereas the logical restore mode allows data to be restored into different file system versions and different file system types and, thus, allows file system independent restoration. The logical restore mode supports restoration of a selected file, or multiple selected files, or entire directories of a volume. With the logical restore mode, selective one or more files can be restored from a backup image without restoring the entire image. Further, one or more files can be restored from a backup image even if some tape blocks are unreadable.

Each backup operation creates a backup image that includes one or more point-in-time images (hereinafter "snapshots") of a volume in a storage subsystem. Backing up multiple snapshots in one backup operation increases the efficiency of the backup performance. The backup is performed on a block-by-block basis. To reduce storage space, common data blocks of the snapshots are not duplicated in the backup image. In one embodiment, a backup image includes one or more snapshots with all of the data blocks. Alternatively, a backup image may include selective snapshots as determined by a user of the storage system, such as a system administrator.

Before further discussing details of the image-based data restoration, it is useful to define certain terminology. In some conventional storage servers, data is stored in logical containers called volumes and aggregates. An "aggregate" is a logical container for a pool of storage, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (i.e., is contained within) an aggregate, and which is managed as an independent administrative unit. A volume includes one or more file systems, such as an active file system and, optionally, one or more persistent point-in-time images of the active file system captured at various instances in time. A "file system" is an independently managed, self-contained, organized structure of data units or file system objects (e.g., files, blocks, or logical unit numbers (LUNs)). Although a volume or file system (as those terms are used herein) may store data in the form of files, that is not necessarily the case. That is, a volume or file system may store data in the form of other units of data, such as blocks or LUNs (referred to generally as "data containers").

To keep track of the organization of blocks stored in an aggregate, a storage server maintains various hierarchical data structures, called buffer trees. A buffer tree can represent a volume defined within an aggregate, or a file or a directory defined within a volume. The root of the buffer tree is known as an "inode", which is a metadata container that contains metadata about the file or the directory. The metadata in an inode can include information about the type of the file/directory, the size of the file/directory, time stamps (e.g., access and/or modification time), permissions and ownership of the file/directory. A directory inode contains a list of the inode numbers of the files in the directory. A file inode contains a list of volume block numbers (VBNs) that identify data blocks owned by the corresponding file.

A buffer tree typically includes both levels, each including numerous blocks, the root of which is the inode. Some blocks in a buffer tree contain actual user-level data—these are referred to as "direct blocks". Other blocks in a buffer tree may simply contain metadata, such as pointers to lower-level blocks—these are referred to as "indirect blocks". There can be multiple levels of indirect blocks in a buffer tree, however, there is always only one level of direct blocks, which is the lowest level of the buffer tree.

Every inode and indirect block in a buffer tree includes a pointer to each lower-level block that it references; each such pointer is called a volume block number (VBN). Each VBN corresponds to, but is not necessarily the same as, a corresponding disk block number (DBN), which indicates the physical location of the target data block on a disk. In addition, each direct block also has a corresponding file block number (FBN), which represents the logical (sequential) position of the block within a file, relative to other data blocks in the file. In some configurations, the data blocks stored in a volume may be deduplicated. In a deduplicated volume, identical data blocks are replaced with pointers to a single copy of the data block. Thus, a single block may be referenced by multiple indirect blocks in multiple inodes. Similarly, multiple inodes may contain the same VBN.

FIG. 1 is a network diagram of an environment 100 in which a restore system operates. The various embodiments described herein are not limited to any particular environment, and may be implemented in various storage systems. In the present illustration, the environment 100 includes a storage server 108. The storage server 108 is coupled with a mass storage subsystem 110, which includes a set of mass storage devices 112, and to clients 102 through a network 106, such as a local area network (LAN) or other type of network. Each of the clients 102 may be, for example, a conventional personal computer (PC), workstation, or the like. The storage server 108 is also coupled to a management server 104, which includes management software configured to allow an administrator to manage the storage server 108 and the mass storage subsystem 110. The mass storage subsystem 110 is managed by the storage server 108. For example, the storage server 108 may receive and respond to various read and write requests from the clients 102, directed to data stored in or to be stored in the storage subsystem 110. The mass storage devices 112 in the mass storage subsystem 110 may be, for example, magnetic disks, optical disks such as compact disks-read only memory (CD-ROM) or digital versatile/video disks (DVD)-based storage, magneto-optical (MO) storage, tape-based storage, or any other type of non-volatile storage devices suitable for storing large quantities of data.

The storage server 108 may have a distributed architecture; for example, it may include separate N-module (network module) and D-module (data module) components (not shown). In such an embodiment, the N-module is used to communicate with the clients 102, while the D-module includes the file system functionality and is used to communicate with the storage subsystem 110. In another embodiment, the storage server 108 may have an integrated architecture, where the network and data components are all contained in a single box or unit. The storage server 108 further may be coupled through a switching fabric to other similar storage systems (not shown) that have their own local storage subsystems. In this way, all of the storage subsystems can form a single storage pool, to which any client of any of the storage systems has access.

Figure 2:
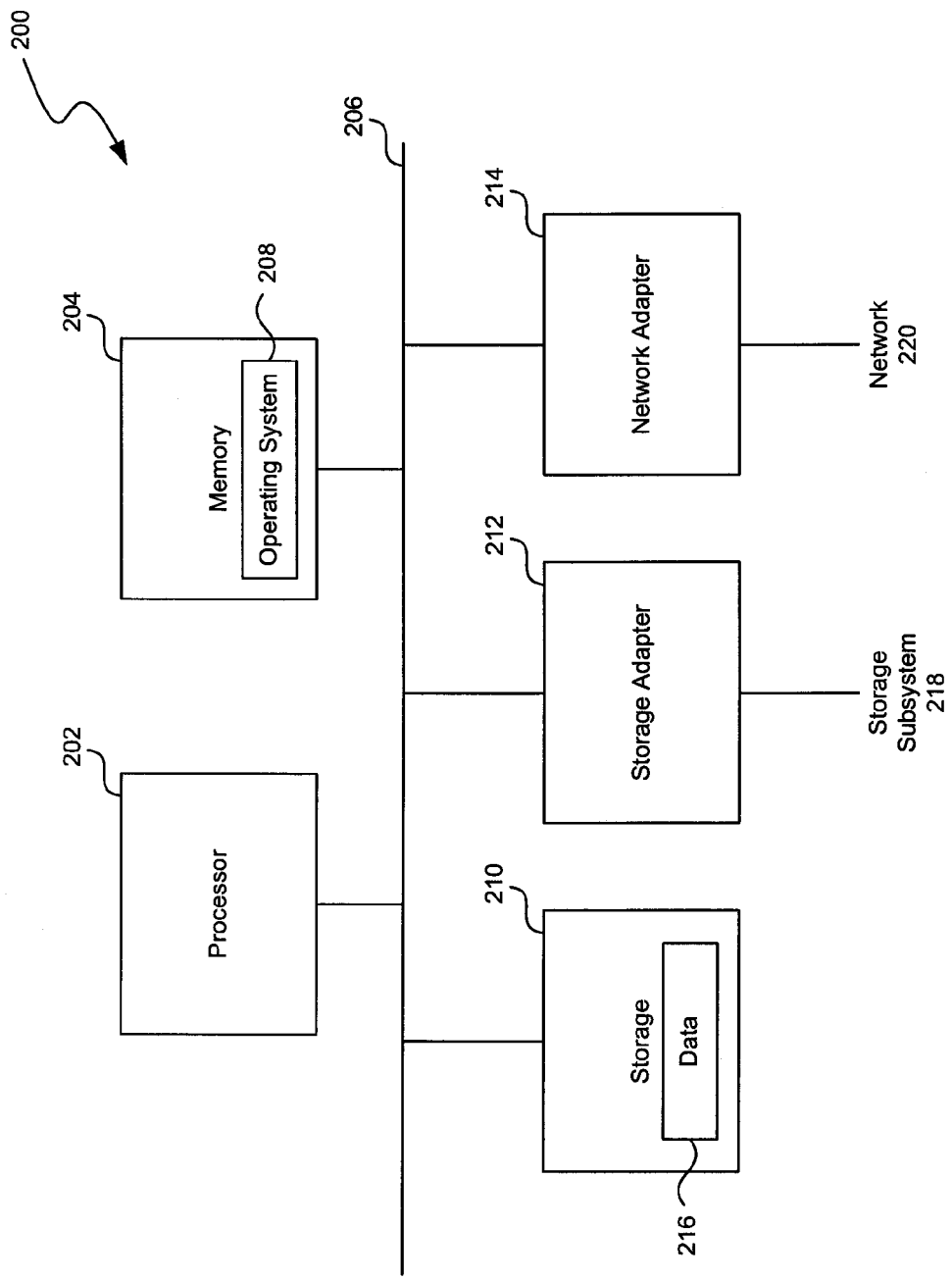
FIG. 2 illustrates an example of the hardware architecture of a storage server.

FIG. 2 is a high-level block diagram showing an example of the architecture of a storage server 200. The storage server 200 may represent the storage server 108 of FIG. 1.

The storage server 200 includes one or more processors 202 and memory 204 coupled to an interconnect 206. The interconnect 206 shown in FIG. 2 is an abstraction that represents any one or more separate physical buses, point-to-point connections, or both connected by appropriate bridges, adapters, or controllers. The interconnect 206, therefore, may include, for example, a system bus, a Peripheral Component Interconnect (PCI) family bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 202 may include central processing units (CPUs) of the storage server 200 and, thus, control the overall operation of the storage server 200. In certain embodiments, the processor(s) 202 accomplish this by executing software or firmware stored in memory 204. The processor(s) 202 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 204 is or includes the main memory of the storage server 200. The memory 204 represents any form of random access memory (RAM), read-only memory (ROM), flash memory, or the like, or a combination of such devices. In use, the memory 204 stores, among other things, the operating system 208 of the storage server 200.

A storage adapter 212 and a network adapter 214 are also connected to the processor(s) 202 through the interconnect 206. The storage adapter 212 allows the storage server 200 to access a storage subsystem 218 and may be, for example, a Fibre Channel adapter or a SCSI adapter. The network adapter 214 provides the storage server 200 with the ability to communicate with remote devices, such as clients, over a network 220 and may be, for example, an Ethernet adapter. The storage server 200 may further include local storage 210 coupled to the interconnect 206.

One skilled in the art will appreciate that the clients 102 and the management server 104 could be implemented using at least some of the same components. For example, the clients 102 or the management server 104 may also include a processor 202 and a memory 204 configured to store an operating system 208. The components are connected using an interconnect 206, such as a PCI bus or other system interconnection. The clients 102 or the management server 104 may also include a storage component 210, such as a hard drive or solid-state storage device, and a network adapter 214, as well as I/O devices (not shown).

Figure 3:
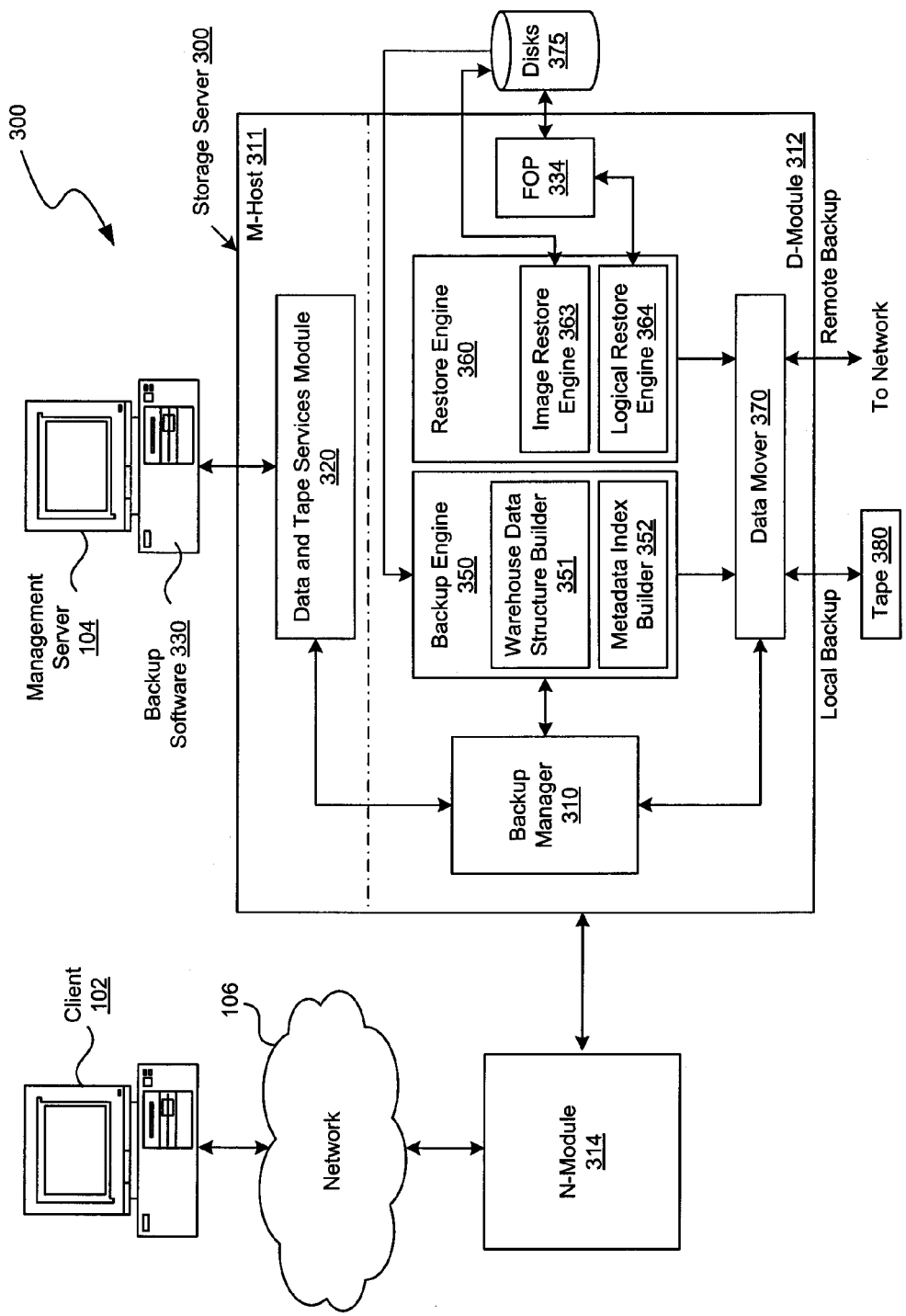
FIG. 3 illustrates an example of a backup architecture for backing up images of a volume managed by the storage server.

FIG. 3 illustrates an embodiment of a backup architecture 300 for implementing the image-based backup described herein. Components that are not germane to the purpose of the discussion are not shown. The backup architecture 300 may be implemented by special purpose circuitry, programmable circuitry, or a combination thereof. For example, in one embodiment, the backup architecture 300 may be located on one or more storage servers 108, and implemented by the components of the storage operating system 208. In the embodiment shown in FIG. 3, the backup architecture 300 includes an M-host 311, a D-module 312, and an N-module 314. The M-host 311 supports communication between the D-module 312 and the management server 104. It may be located on a host separate from the storage server 108; or, in the embodiment as shown, located on the storage server 108. The D-module 312 manages the mass storage subsystem 110. The N-module 314 supports communication between the D-module 312 and the clients 102 through the network 106. The N-module 314 and the D-module 312 cooperate to provide a scalable architecture to enable the clients 102 to access data on the storage subsystem 110. Thus, the N-module 314 includes components that implement network access protocols to enable communication over the network 106, such as Ethernet, Internet Protocol (IP), Transport Control Protocol/Internet Protocol (TCP/IP), Fibre Channel Protocol (FCP) and/or User Datagram Protocol/Internet Protocol (UDP/IP). The N-module 314 also includes interconnection components that enable high-speed communication with the D-module 312.

Referring to FIG. 3, a data and tape services module 320 interfaces with users or client-side backup software 330 to configure and manage the backup environment. The data and tape services module 320 may be part of the M-host 311 or a module separate from the M-host 311. The data and tape services module 320 provides an interface at the server side to communicate with the client-side backup software 330. The data and tape services module 320 also forwards client-side requests to the D-module 312 to perform requested backup or restore operations.

The D-module 312 includes a backup engine 350 for generating image backup data streams, and a restore engine 360 for restoring the backup data from tapes 380. A data mover 370 interfaces with both the backup engine 350 and the restore engine 360 to perform tape I/O operations. The data mover 370 interacts with the tapes 380 that are locally connected to the storage server 108, or remote backup storage via a network. The D-module 312 also includes a backup manager 310, which coordinates backup operations of the client 104, the data and tape services module 320, the backup engine 350, the restore engine 360 and the data mover 370. Further, the backup manager 310 can be configured to coordinate backup operations in a cluster environment, where one or more of the components of the backup architecture 300 reside on separate storage servers.

When a client sends a request to backup a volume, the backup engine 350 generates a backup image, in one backup operation, that includes all of the point-in-time images ("snapshots") of a volume that are currently stored ("in use") in the storage subsystems 110, or one or more snapshots selected by the client. The backup engine 350 may retrieve data from disks 375 the storage operating system 208. In one embodiment, the backup engine 350 includes a warehouse data structure builder 351 and a metadata index builder 352 to construct a backup image for a volume. The warehouse data structure builder 351 of the backup engine 350 retrieves data blocks from the disks 375, and stores the data blocks in a backup image. The metadata index builder 352 retrieves metadata of the data blocks from the disks 375 and stores the metadata in the backup image. The metadata provides the logical restore engine 364 of the restore engine 360 with the ability to restore the entire image. Alternatively, the system may restore the entire image of the volume using the image restore engine 363.

In one embodiment, the restore engine 360 includes an image restore engine 363 for restoration of an entire image of a volume that is file system version dependent. Thus, the image restore engine 363 may only restore a backup image on certain file system versions. Illustratively, if a backup is performed on a system with a file system version X, the image restoration may only be performed on a system with the same file system version X. The image restored by the image restore engine 363 includes all of the blocks in a volume, such as user data and system metadata, and preserves the block layout of the volume. As some system metadata (such as configuration data of the storage operating system 208, features of the data blocks, etc.) is tied to the block layout, the restored image allows the system metadata to continue to function after restoration. The restore engine 360 also includes a logical restore engine 364 for restoration of one, multiple, or entire files and directories of a volume that are file system version independent. Thus, the logical restore engine 364 can perform restoration on a system with any file system version as long as the system supports image-based backup and restore features. However, the logical restore engine 364 changes the block layout, and is, therefore, unable to recover some of the system metadata.

In one embodiment, the logical restore engine 364 saves the restored data in the disks 375 via a file operation module (FOP) 334. The FOP module 334 receives requests from the restore engine 360, generates actions according to the requests, and transforms the actions into file system messages that restore directories and files and save them into the disks 375. Operations of the restore engine 360 and the file operation module 334 will be described in greater detail below in connection with FIGS. 6-12.

Figure 4C:
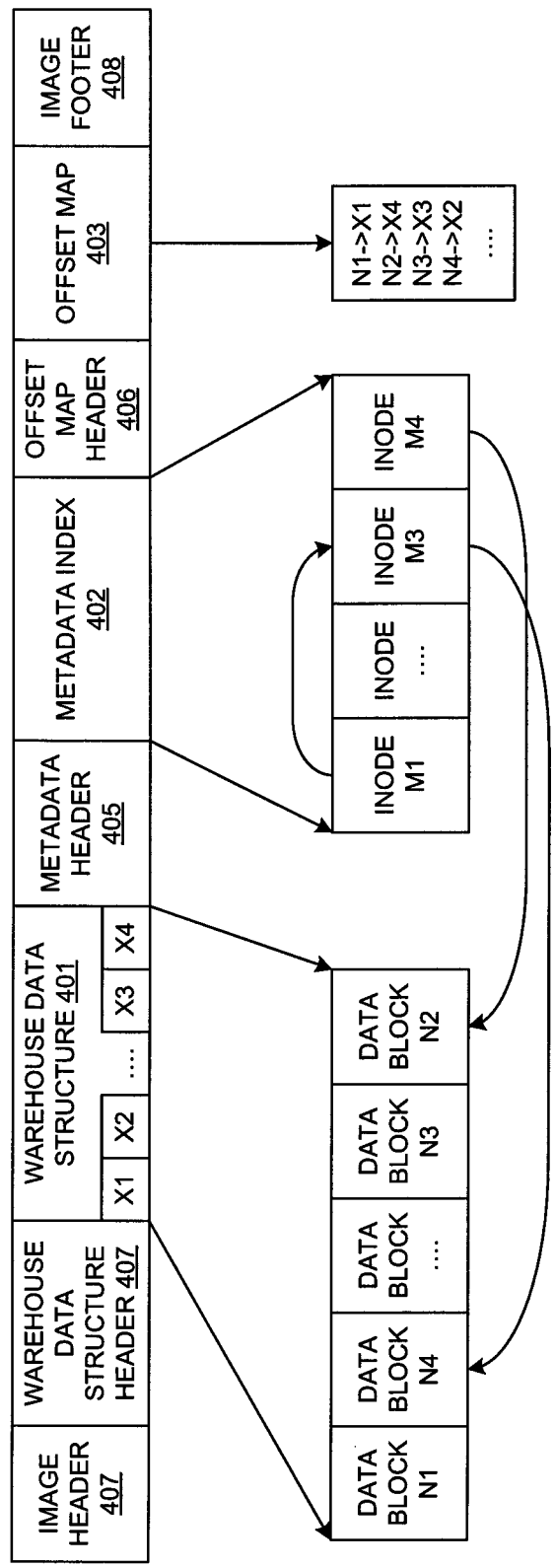

FIGS. 4A-4C show examples of a backup image at a high level. As will be described in greater detail below, the backup image has a structure that can be efficiently generated during backup. The backup image does not retain the buffer tree structure of a volume, as in the storage subsystem 110. Instead, the backup image contains a collection of data blocks and metadata blocks. The data blocks are simply a raw image of the volume. The metadata blocks contain pointers that inter-relate the data blocks.

Referring to FIG. 4A, in one embodiment, a backup image 420 includes a number of data blocks intermixed with a number of metadata blocks. The data blocks include the data blocks that constitute one or more snapshots of a volume, and the metadata blocks include the corresponding metadata of the data blocks. The data blocks and metadata blocks are stored in any order convenient for a backup operation, without any ordering constraints. Illustratively, a data block (or a metadata block) for a more recent snapshot may be stored before or after another data block (or another metadata block) of an older snapshot. In one embodiment, the data blocks and metadata blocks are stored in the backup image 420 in the same order as they are retrieved from disks. The backup engine 450 may then determine an order that is most time-efficient.

Referring to FIG. 4B, in another embodiment, a backup image 410 includes a first section, referred to as a warehouse data structure (or simply "data warehouse") 401, for storing data blocks of a volume. The blocks in the warehouse data structure 401 are saved on tape in VBN order. The backup image 410 also includes a second section, referred to as a metadata map (or metadata index) 402, for storing corresponding file system metadata of the data blocks, such as inodes, directory entries, file block VBN list, etc.). Within each of the first and the second sections, the data blocks and the metadata blocks can be stored in any order without any ordering constraints. Alternatively, either or both of the data blocks and the metadata blocks can be stored according to a given order, such as the order of snapshots, VBNs, or the like. In a scenario where the data blocks and/or the metadata blocks are ordered by snapshots, it is unnecessary to impose any ordering constraints within each of the snapshots. The backup images 410 and 420 may include additional sections, such as header and footer, as well as other sections, as discussed below.

In yet another embodiment, shown in FIG. 4C, a backup image 400 includes the warehouse data structure 401, the metadata map 402, an offset map 403, and additional sections 404-408, which will be described in more detailed later. The offset map 403 contains the block offset, on the physical backup storage media, of every data block in the warehouse data structure 401, indexed by VBN, to speed up data retrieval at restore time. In one embodiment, the offset map 403 includes a header containing one or more VBNs, followed by the offsets for those VBNs, in the same order that they appear in the header.

In the embodiments shown in FIGS. 4A-4C, each data block is identified by a VBN. The VBN is the identifier of the data block in the storage subsystem 110 (e.g., disks) of FIG. 1. Each data block has a fixed size, e.g., 4 kilobytes. These data blocks collectively represent one or more snapshots of the volume. The snapshots may include all of the snapshots of the volume that are currently stored in the storage subsystem 110, or one or more specific snapshots selected by a client.

The metadata blocks of FIGS. 4A-4C provide the necessary metadata to locate and restore directories and files. In one embodiment, each metadata block includes an inode, such as a directory inode or a file inode. Each inode has an identification number (an inode number) and associated attributes including the type of inode (such as a directory inode or a file inode). A directory inode contains a list of inode numbers of files in the directory. A file inode contains a list of VBNs that identify the data blocks owned by the corresponding file. The metadata blocks are a logical representation of a file system structure and, therefore, are independent of on-disk file system format. In the embodiments of FIG. 4A and FIG. 4B where the metadata blocks are not ordered by snapshots, each metadata block may include a snapshot identifier to identify its membership in a snapshot. Further, in the embodiments of FIGS. 4A-4C, the computation of the metadata blocks and the writing of data blocks to a backup image can be executed concurrently to speed up the backup process.

The backup images described above do not include more than one each of any data blocks that are common to any of the snapshots. Only the data blocks that have been changed since an immediate-preceding snapshot are stored in the backup image. The images also maintain deduplication that has been performed on the volume. Thus, a backup image consumes approximately the same amount of space that the actual volume consumes. In contrast, a file-based backup is not aware of deduplication and therefore expands every file, creating a backup image much larger than the actual volume. Thus, there is no duplication of data blocks in any of the backup images. With respect to metadata blocks, in one embodiment, a backup image contains only the metadata blocks corresponding to the data blocks in that same backup image, and, therefore, there is also no duplication of the metadata blocks in the backup image either. In an alternative embodiment, the metadata blocks for each of the backed up snapshots are stored in their entirety for increased speed during data restoration.

Referring again to FIG. 4C, the backup image 400 also includes a warehouse data structure header 404, a metadata header 405 and an offset map header 406 to mark the beginning of each of the three sections (the warehouse data structure 401, the metadata map 402 and the offset map 403). The backup image 400 further includes an image header 407 and an image footer 408 to mark the beginning and end of the backup image 400. In one embodiment, the image header 407 contains information about the volume backed up in this backup image, such as volume language, deduplication, and the like. The image footer 408 contains summary information of the backup image 400, such as the offsets on tape of the warehouse data structure 401, metadata map 402 and offset map 403 within the backup image 400. The offset map 403 of the backup image 400 records the block offset, on physical storage (e.g., tape 380), of every data block in the warehouse data structure 401, indexed by VBN. For example, the offset map 403 includes a mapping of the VBN of each data block in the backup image to an offset on tape 380.

Backup operations can be performed incrementally. For example, a backup operation can be followed by one or more incremental backup operations. Each incremental backup operation generates an incremental backup image, in which only incremental changes from the previous backup operation are stored. A "backup set" includes one or more backup images, including at least a baseline backup image (which is also referred to as a "level-0" backup image), and possibly including one or more incremental backup images. A backup image can span multiple tapes (or other physical backup media). Each backup image (level 0 or incremental) includes data blocks of at least one snapshot of the volume being backed up. A level-0 backup includes all of the data in the volume. An incremental backup includes the changed data since the last backup image was created. Each backup set has a unique identifier. A new backup set is created whenever a level-0 backup is performed.

During a level 0-backup, all of the volume snapshots are captured in the backup image. The earliest snapshot in time is considered the "baseline" snapshot. The file history generated during this operation includes everything in the baseline snapshot as well as the differences between every pair of snapshots that are created next to the other chronologically.

Figure 5A:
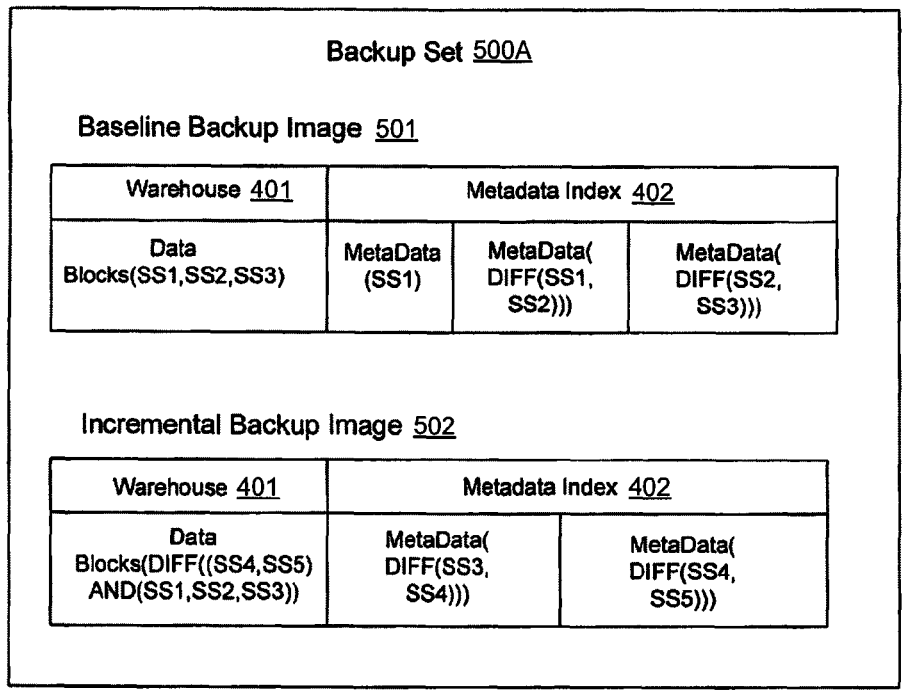
FIGS. 5A and 5B illustrate examples of backup images generated by incremental backup operations.
Figure 5B:
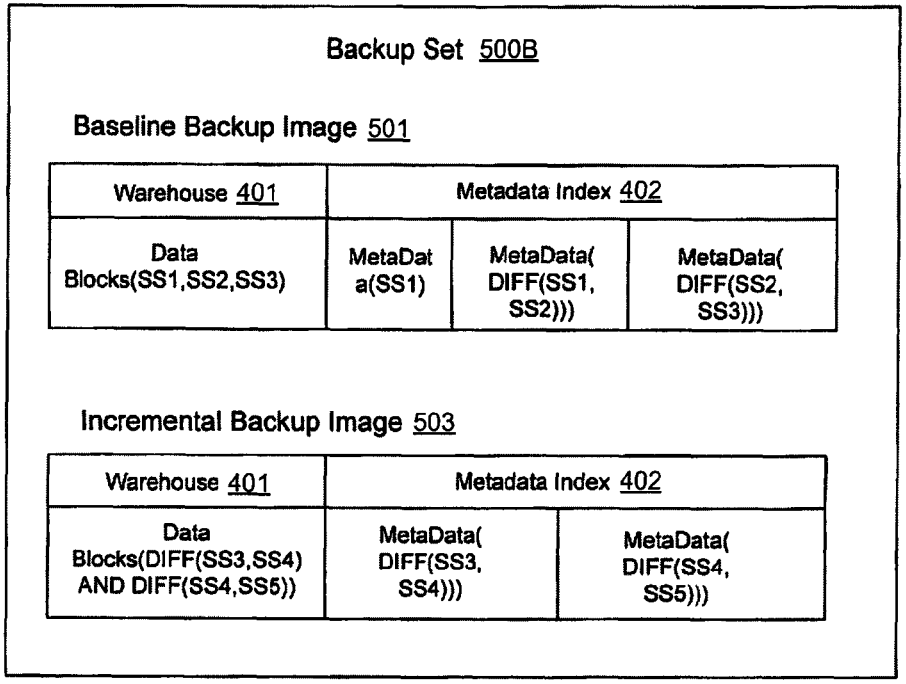

FIGS. 5A and 5B show examples of backup sets, each including multiple backup images generated by the backup engine 350 of FIG. 3 in two consecutive backup operations. In FIG. 5A, backup set 500A includes backup images 501 and 502. Backup image 501 is generated as a baseline backup (which is also referred to as a "level-0" backup), and the backup images 502 and 503 are generated as incremental backups (which are also referred to as level-1 backups). Illustratively, baseline backup image 501 includes the data blocks and metadata blocks of three snapshots $SS_1$, $SS_2$, $SS_3$, without duplication of any common data blocks. In one embodiment, the backup image 501 stores the entire data blocks of snapshot $SS_1$, the difference (shown in FIGS. 5A and 5B as "diff") between $SS_2$ and $SS_1$, and the difference between $SS_3$ and $SS_2$. Note that the actual data blocks in a backup image are stored in the warehouse data structure 401 of the backup image, while metadata identifying the differences ("diff") between snapshots are stored in the metadata index 402 of the same backup image (FIG. 4C).

Incremental backup images 502 and 503 include the data blocks and metadata blocks of two snapshots $SS_4$, $SS_5$. In the embodiment of FIG. 5A, backup image 502 is generated by computing the difference between snapshots ($SS_4$, $SS_5$) and snapshots ($SS_1$, $SS_2$, $SS_3$) with respect to data blocks and metadata blocks in these snapshots. In the embodiment of FIG. 5B, backup set 500B includes backup images 501 and 503. Backup image 503 is generated by computing the difference between snapshots $SS_4$ and $SS_3$, and the difference between $SS_5$ and $SS_4$, with respect to data blocks and metadata blocks. The metadata blocks in the incremental backup images 502 and 503 may also include the parent directories of the files and directories that have been updated since a last backup operation to allow reconstruction of the full pathname of the updated files and directories. This incremental storage of snapshots and metadata greatly reduces backup storage space at the expense of a slight increase in overhead during data restoration time.

In one embodiment, the image-based backup described herein preserves deduplication, compression and encryption properties of the data. That is, if the source data is deduplicated, compressed or encrypted, the backup data on tape will be stored in the same form. For example, a shared block in a deduplicated volume will be backed up only once in the warehouse data structure 410, therefore making backup efficient for disk reads and tape writes. In addition, the backup image on tape will use less space than it would otherwise, just as with the original volume. Similarly, compressed or encrypted blocks will be read without being decompressed or decrypted when being backed up in the warehouse data structure 410.

Figure 6:
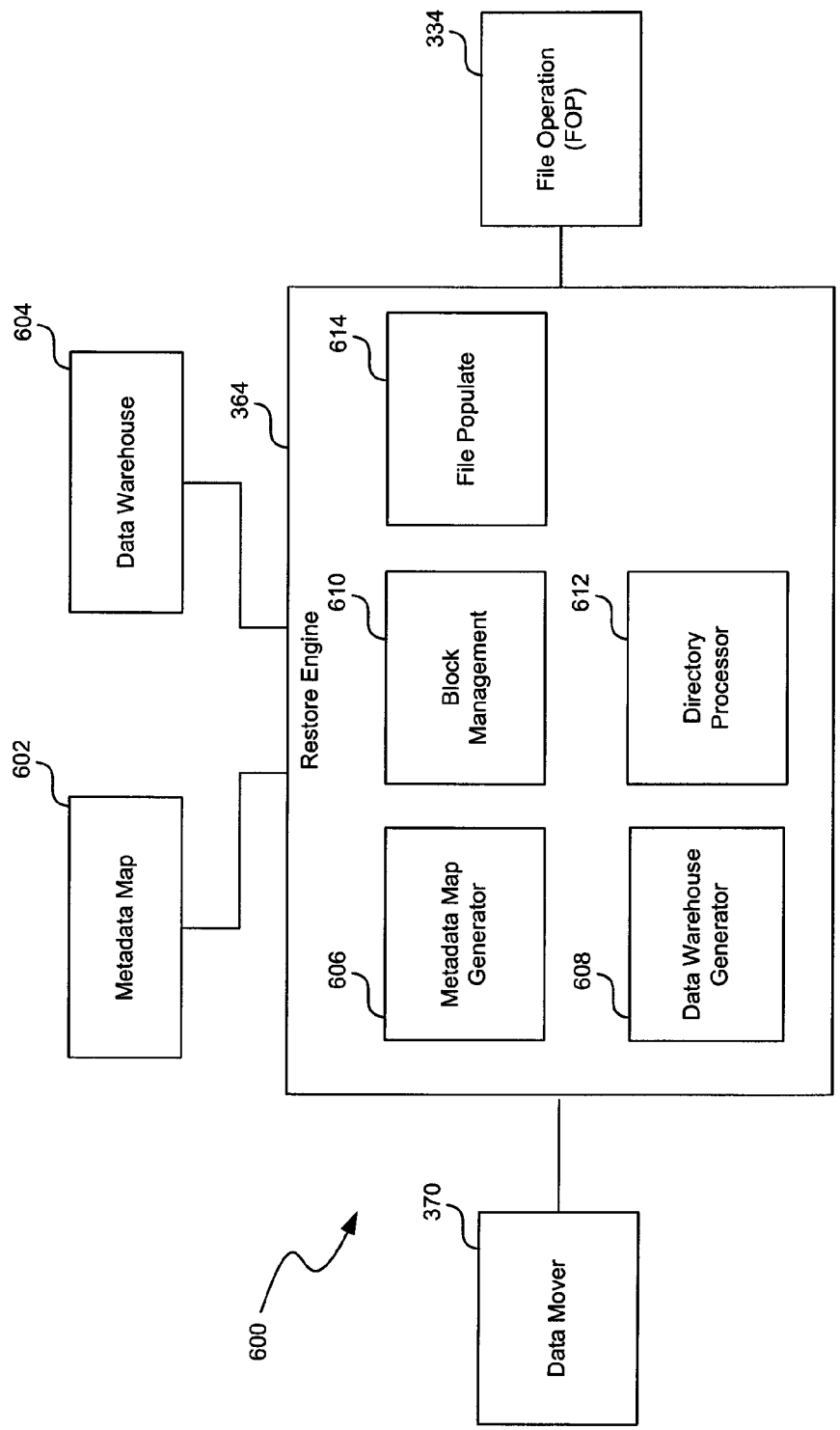
FIG. 6 illustrates a logical block diagram of a logical restore system.

FIG. 6 is a logical block diagram of the logical restore system 600, which includes components previously described with reference to FIG. 3. The logical restore system 600 provides functionality to restore a backup image (e.g. the backup images of FIGS. 4A-C) to a target storage device, such as the storage server 108. Aspects of the system may be implemented as special purpose hardwired circuitry, programmable circuitry, or as a combination of these. As will be described in additional detail herein, the system 600 includes a number of modules to facilitate the functions of the system. Although the various modules are described as residing in a single server, the modules are not necessarily physically co-located. In some embodiments, the various modules could be distributed over multiple physical devices and the functionality implemented by the modules may be provided by calls to remote services. Similarly, the data structures could be stored in local storage or remote storage, and distributed in one or more physical devices. Assuming a programmable implementation, the code to support the functionality of this system may be stored on a computer readable medium such as an optical drive, flash memory, or a hard drive. One skilled in the art will appreciate that at least some of these individual components and subcomponents may be implemented using application specific integrated circuits (ASICs), programmable logic, or a general-purpose processor configured with software and/or firmware.

As shown in FIG. 6, the system includes the data mover 370, which interfaces with a tape drive system or a similar long term backup system (e.g. a virtual tape library (VTL) system). The system 600 also includes the logical restore engine 364, which is configured to process the backup image to generate a set of file operations to be executed to restore the complete image. In executing these steps, the restore engine reads the backup image using the data mover 370, generates the metadata map structure 602 and the data warehouse lookup structure 604, and provides a set of file system operations to the FOP module 334. The FOP module 334 is receives a set of file operation commands from the restore engine and executes the file operation commands on the file system. The FOP module 334 may be implemented as a separate thread in a single process, or as an independently operating hardware or software component on the storage server 108. Alternatively, the file operation component may be integrated with the restore engine 364. In some embodiments, the file operation component 612 executes separately in order to avoid requiring the restore engine 364 to wait for file operations to finish executing during the restore process.

The restore engine 364 includes various subcomponents to assist in execution. The restore engine 364 includes a metadata map generator component 606, which is configured to generate the metadata map structure 602 based on the backup image received from the data mover 370. The metadata map structure 602 may be generated in order to allow the system random access to the metadata during the restore process. In some embodiments, the system generates the metadata map structure 602 in order to speed access to the metadata information. This may be more efficient because the backup image is generally stored to a sequential access medium, such as a tape. Speed of access in a sequential medium depends on physical proximity of the data and may vary significantly as parts of the data are accessed. In contrast, a random access medium allows uniform access time for all data. In these embodiments, the metadata map structure 602 may be maintained in system memory or in local or remote storage. In other embodiments, the system is configured to read the metadata information directly from the backup image through the data mover 370 without storing the information in random access storage.

The restore engine also includes a data warehouse generator component 608, which is configured to generate the data warehouse lookup structure 604. The data warehouse lookup structure 604 is a lookup data structure used to map information in the metadata map to individual data blocks in the backup image. The use of the data warehouse lookup structure 604 is discussed in greater detail below. The restore engine 364 also includes a block management component 610, which is configured to copy data blocks from the backup image to the target storage device. The block management component 610 and the data warehouse generator component 608 work in combination to generate the data warehouse lookup structure 604.

The restore engine further includes a directory processor component 612, which is configured to generate a directory and file structure on the target storage device based on the information in the metadata map structure 602. As discussed above, the metadata map structure 602 includes information defining individual directories and subdirectories in the backup image and defining a relationship between the directories and subdirectories. In one embodiment, the metadata map structure 602 is constructed as a tree data structure in the memory of the storage server. The metadata map structure 602 also includes data defining file metadata and a file block list for each file in the system. The file block list is a list of data blocks (e.g. VBNs) included in the corresponding file. The directory processor component 612 uses the directory relationship information, the directory definition information, and the file definition information to generate the directory structure on the storage device. The directory processor 612 also generates empty files within the directory structure. As used here, an "empty file" is a file data structure (e.g. inode) on the target server that may include metadata information but does not include direct blocks referencing data blocks stored by the target storage device.

The restore engine 610 also includes a file populate component 614, which is configured to populate the empty files in the directory structure based on information in the data warehouse lookup structure 604 and the metadata map structure 602. This may include, for example, associating data blocks from the data warehouse lookup structure 604 with the file's inode. In some embodiments, the directory processor component 612 and the file populate component 614 execute their processing by generating file operations that are executed by the FOP module 334. The directory processor component 612 and the file populate component 614 may also be integrated into a single component that generates directories and files and populates the files concurrently. This process is discussed in greater detail below.

Figure 7:
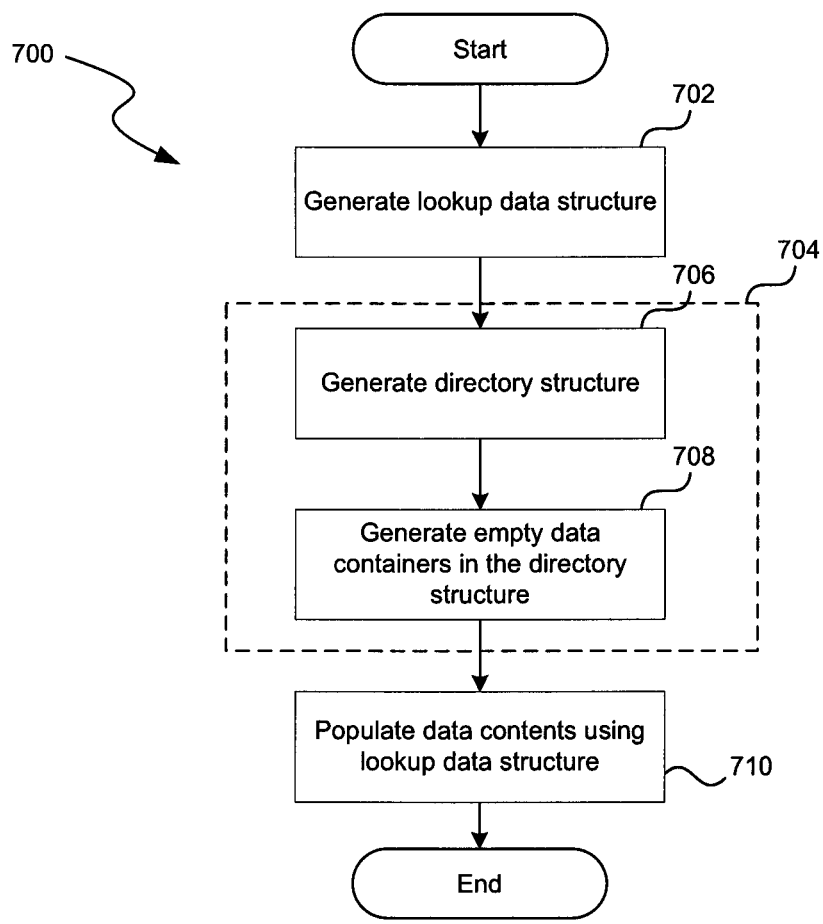
FIG. 7 illustrates a flowchart of a process for restoring a full backup to a storage device based on the backup image.

FIG. 7 is a flowchart of a process 700 for restoring a full backup to a storage device based on the backup image. Processing begins at step 702, where the system generates the lookup data structure based on a baseline backup image having a format such as discussed above (FIGS. 5A-5C and 6A-6B). In addition to generating the data warehouse lookup structure 602 in this step, the system may also generate the metadata map structure 602 and copy data blocks from the backup image to the storage device. Processing then proceeds to aggregate step 704, where the system generates a directory and file structure based on the metadata map structure 602. Steps 706 and 708 are aggregated in step 704 in order to indicate that the steps may be performed consecutively or concurrently. The processing of aggregate step 704 is discussed in greater detail below with respect to FIG. 9. In particular, in step 706 the system generates the directory structure. This may include, for example, performing a directory walk through the directory structure defined in the metadata map and generating new directories at each level of the directory walk. Processing then proceeds to step 708, where the system generates an empty file for each individual file in the backup image. The system then proceeds to step 710, where it populates the empty files that were generated in step 708. During this step, the system uses information in the metadata map and the data warehouse to determine the restored data blocks to associate with the direct blocks for the empty files. Although the processing of steps 708 and 710 is depicted as occurring in series, the processing of steps 706-710 may be executed concurrently, so that the system generates directories and populates the data blocks of each file immediately after the empty file is created. In some embodiments, the system executes steps 706-710 by generating file operations for each of the file system actions to be executed. The system provides the file operations to the FOP module 334, which executes the file operations to generate files and directories and to populate the file empty files. After the system has populated the files in the restored file system, the process 700 ends.

Figure 8:
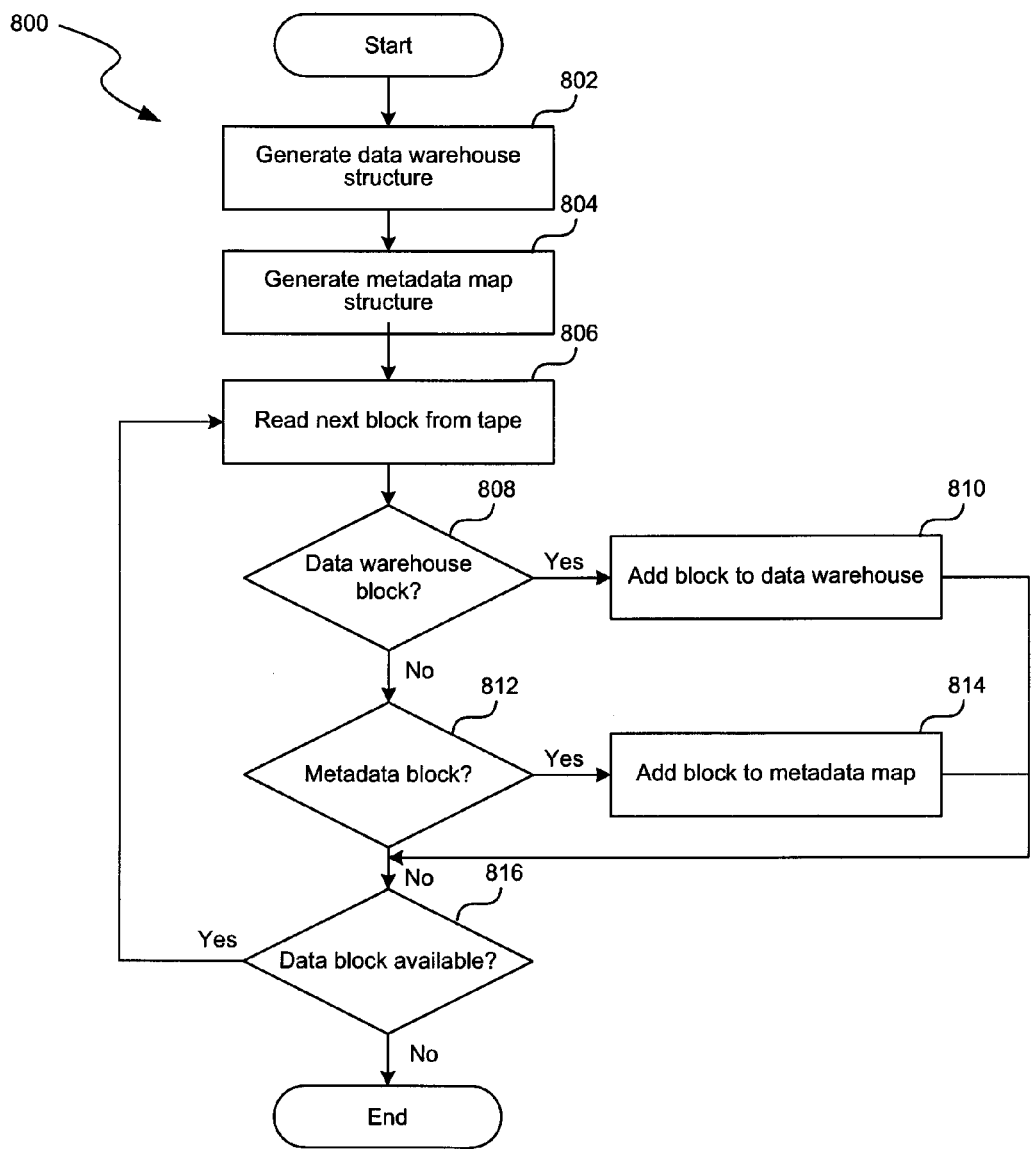
FIG. 8 illustrates a flowchart of a process for generating the restore data structures used by the system during a restore of a baseline backup image.

FIG. 8 illustrates a flowchart of a process 800 for generating the restore data structures used by the system during a restore of a baseline backup image. The system may execute the process 800 during step 702 of the process 700 (FIG. 7). Although the steps of the process 800 are shown in a particular order, the order of these steps may be modified to efficiently read the backup image from the tape. For example, the process 800 may be varied so that the system does not have to seek in the backup tape (i.e. by building the data structures progressively as the data is read from the tape).

The process 800 begins executing in step 802, where it generates a data warehouse lookup structure. The data warehouse lookup structure may be implemented as a look-up table in memory or as a file in the storage device's file system. The system then proceeds to step 804, where it generates the metadata map structure 602. This may include, for example, initializing the metadata structure in system memory. The system then proceeds to step 806, where it reads the next block from the tape.

After the data block is read, the system proceeds to decision block 808, where it determines if the block is a data warehouse block. If so, the system proceeds to step 810, where it adds the data block to the data warehouse lookup structure 604. This may include, for example, copying the data block from the backup image to the target storage device. As discussed above, in a logical restore individual data blocks will generally have a VBN in the restored file system that differs from the data block's original VBN. The system then adds the block to the data warehouse and associates the block with an index based on the data in the metadata map. The index may be, for example, the VBN associated with the data block in the backup image. If the block is not a data warehouse block, the system proceeds to step 812, where it determines if the block is a metadata block. If the block is a metadata block, processing proceeds to step 814, where the system adds the block to the metadata map structure. As discussed above, the metadata map may be implemented using well known data structures, such as a tree structure or a linked list. Techniques for using these structures are well-known and are not described here. After the metadata map has been generated, the system may store the structure in local storage 210, the storage subsystem 110, or system memory 204.

If the block is not a metadata block, the system may perform other processing based on the block. The system then proceeds to decision step 816, where it determines if a new block is available in the backup image. If a new entry is available, the system returns to step 806, where it reads the next block from the image. The system repeats steps 806-816 until all blocks have been read from the backup image. If no new blocks are available, the process ends.

In one implementation, the data warehouse lookup structure is a file on the file system of the target storage device. As discussed above, a file is represented by an entry in the inode list. In this implementation, the system creates an inode for the file in step 806. The file is then defined so that the buffer tree in the inode includes references to every data block included in the backup image. As described above, each data block in a file has an associated file block number (FBN), which defines the order of data blocks in the file. In one embodiment of the system, the data warehouse file is generated so that the FBN of each data block in the data warehouse is identical to the VBN associated with the data block in the backup image. This simplifies the lookup process during the file populate stage by enabling the system to use the backup image's VBN to quickly find the desired data block in the data warehouse lookup structure. This is particularly useful because the file system is designed to find individual data blocks quickly in response to a request. Thus, the file can be efficiently used to locate particular data blocks. In addition, the file implementation may be preferred because the data warehouse lookup structure may be too large to store in system memory. In this implementation, the system in step 808 reads the data block and the VBN from the backup image. In step 810, the system copies the data block to the target storage device and adds the data block to the file with the VBN as the block's FBN in the file. The inode's buffer tree then includes a direct block that points to the block's restored location (which may include a new VBN for the block).

Figure 9:
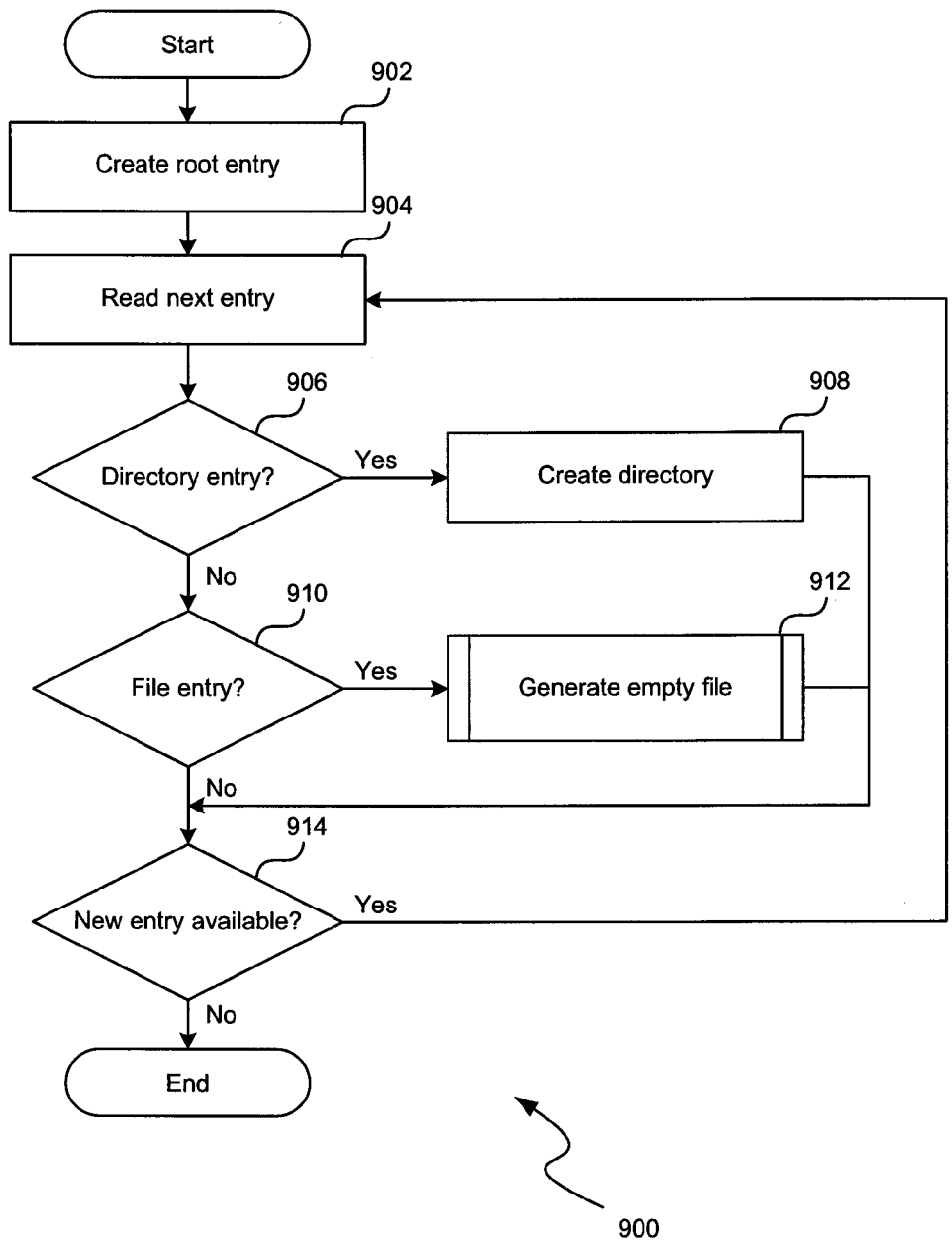
FIG. 9 illustrates a flowchart of a process for generating a directory structure on the storage device.

FIG. 9 is a flowchart of a process 900 for generating the directory structure on the storage device. The process 900 may be executed, for example, during aggregate step 704 in the process 700 (FIG. 7). The file operations may be executed by the FOP module 334, so that the restore engine 364 can execute without waiting for individual file operations to complete. Processing begins in step 902, where the directory processor component 612 creates the root entry in the file system of the storage device, based on information in the metadata map. The root entry may be, for example, a root directory in the directory structure. After the root entry has been created, the system proceeds to step 904, where it reads the next entry in the metadata map structure 602. The system navigates through the metadata map structure 602 using a method chosen to ensure that the system processes every entry in the data structure. If the metadata map is a tree structure, the system may navigate the tree in a depth-first or breadth-first fashion.

After reading the next entry, processing proceeds to decision step 906, where the system determines if the entry is a directory entry. If the entry is a directory entry, the system proceeds to step 908, where it creates the directory based on the directory entry information. Creating the directory may include providing metadata from the backup image (e.g. creation time, modify time, permissions, etc.) to the FOP module 334.

If the new entry is not a directory entry, processing proceeds to decision step 910, where the system determines if the entry is a file entry. If the entry is a file entry, the system proceeds to processing step 912, where it generates an empty file based on the file entry information. This process is discussed in greater detail below with reference to FIG. 10. After processing the metadata map entry, the system proceeds to decision step 914, where it determines if a new entry is available in the metadata map. If a new entry is available, the system returns to step 904, where it reads the next entry from the metadata map. The system repeats steps 904-914 until all entries have been read from the metadata map. If no new entries are available, the process ends.

One skilled in the art will appreciate that decision step 910 is not essential if the metadata map structure 602 only stores two types of entries. However, the metadata map may also include other types of entries, such as hard links and/or soft links. In these cases, the system may add similar steps to handle these new types.

Figure 10:
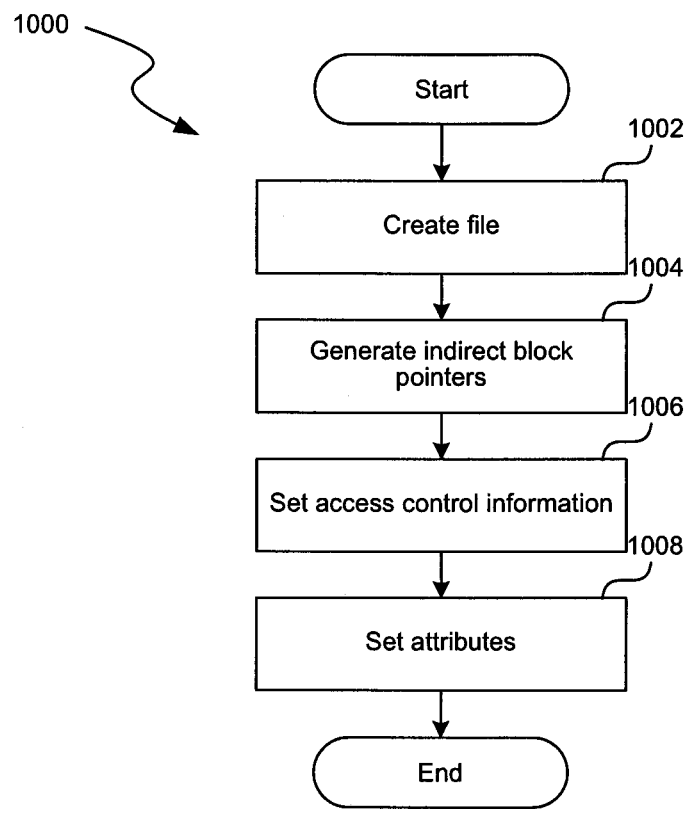
FIG. 10 illustrates a flowchart of a process for creating an empty file on the storage device.

FIG. 10 illustrates a flowchart of a process 1000 for creating an empty file on the storage device. The process 1000 may be executed, for example, during step 912 of the process 900 (FIG. 9). Processing begins at step 1002, where the system creates the new file. This may include, for example, creating the new inode and adding the inode to the inode list. The system then proceeds to step 1004, where it generates indirect block pointers for the file. In this step, the system creates the buffer tree used to store the block pointers associated with the file. The system then proceeds to step 1006, where it sets access control information associated with the new file. The access control information may be determined based on information stored in the metadata map. After setting access control information, the system proceeds to step 1008, where it sets attributes associated with the file. These attributes may include, for example, file type, creation time, modification time, etc.

Figure 11:
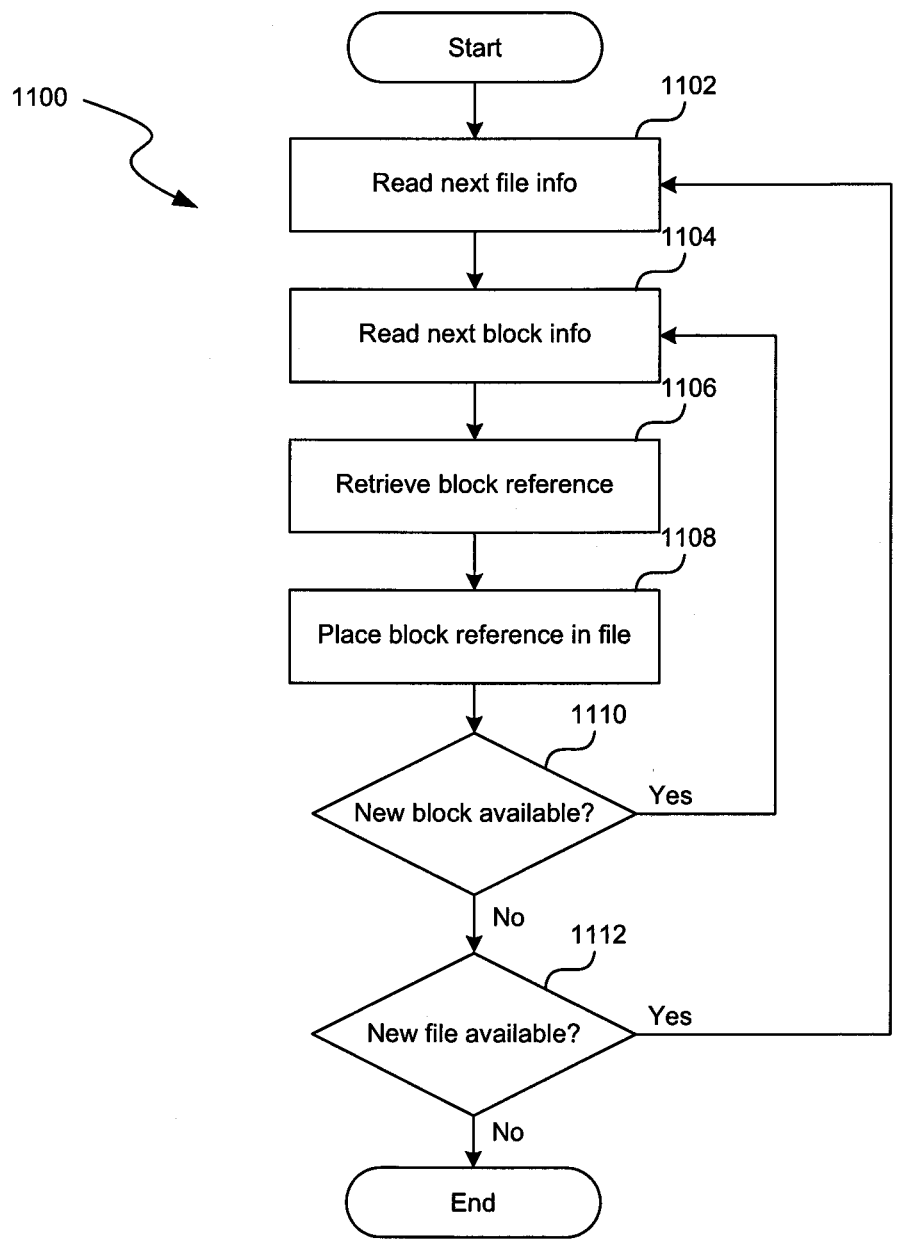
FIG. 11 illustrates a flowchart of a process for populating file data on the storage device.

FIG. 11 is a flowchart of a process 1100 for populating file data on the storage device. The process 1100 may be executed, for example, by the system during step 706 of the process 700 of FIG. 7. The process 1100 populates data blocks for each file on the storage device. The system may select files using the inode list or the metadata map structure. In either case, processing begins in step 1102, where the system reads the next available file entry. The file entry includes the file's inode (from the storage device's inode list) and a file block list from the backup image. After reading the file entry, processing proceeds to step 1104, where the system reads the next data block information from the file block list. This may include, for example, reading the VBN or other identifier from the file block list. The system then proceeds to step 1106, where it retrieves the block reference associated with the block information. The system retrieves the block reference by using the VBN (or other identifier) as an index into the data warehouse lookup structure 604. The system then finds the block reference (e.g., VBN on the restored file system) corresponding to the index. As discussed above, in some embodiments the data warehouse lookup structure 604 is a file in the file system of the target storage device. In these embodiments, the system uses the identifier to find the data block associated with the FBN having the same value. After retrieving the block reference associated with the identifier, processing proceeds to step 1108, where the system places the block reference in the current file. In a system that supports de-duplication, the system may do so by copying the block reference from the data structure into the current file, because the file system is able to maintain multiple references to a single data block. Alternatively, the system may move the block reference from the data warehouse file to the current file.

Processing then proceeds to decision step 1110, where the system determines if a new data block is available for the selected file. If a data block is available, the system repeats steps 1104-1110 until all blocks have been added to the current file. If a new block is not available for the current file, the system has processed all blocks and proceeds to decision step 1112, where it determines if a new file is available for populating. If a new file is available, the system repeats steps 1104-1110 to populate the data blocks of the new file. If no new file is available, the process ends. In an alternate embodiment, the system populates each file after it is created. In this embodiment, the system omits the outer loop of the process 1100 and executes the inner loop of steps 1104-1110 for each file after the file structure is created. The steps of process 1100 may also be executed before the system sets access control and attribute information in the files.

Figure 12:
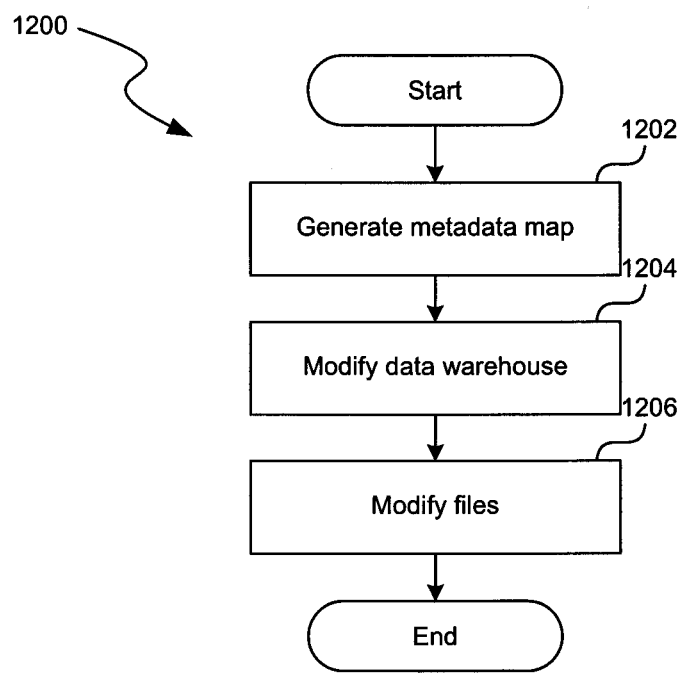
FIG. 12 illustrates a flowchart of a process for restoring an incremental backup to the storage device.

Although the discussion above generally discussed the process for restoring a baseline (level 0) backup image, similar steps and data structures may be used to restore from an incremental backup image (e.g., incremental backup images 502 or 503 of FIGS. 5A and 5B). FIG. 12 is a flowchart of a process 1200 for restoring an incremental backup to the storage device. The process 1200 may be executed to restore the incremental backup image to the storage device after the baseline backup image has already been restored to the system. Processing begins at step 1202, where the system generates a metadata map structure 602 based on the incremental backup image. The system may generate the metadata map using a process similar to the process discussed above for restoring a baseline backup image. The generated metadata map structure 602 will then contain information associated with directories and files that changed after the baseline backup image was generated. This may include, for example, file block lists for the files that were changed.

Processing then proceeds to step 1204, where the system modifies the data warehouse lookup structure based on the data warehouse information in the incremental backup image. This may include, for example, modifying the data warehouse file based on the new information by replacing data blocks in the file that changed after the baseline backup. In a system that supports deduplication, keeping the data warehouse file has little cost because every data block in the file is shared with at least one other file. By retaining the data warehouse file after the baseline restore, the system can more quickly complete the incremental restore.

The system then proceeds to step 1206, where it modifies the files on the target device based on the new metadata map structure 602 and the modified data warehouse lookup structure 604. This may be executed using processes similar to those disclosed in FIGS. 9-11. For new files or directories, the process is identical, as the system creates the directories and empty files and populates the files based on the modified data warehouse lookup structure 604. For changed directories or files, the system changes the structure on the storage device and modifies the data blocks associated with the modified files to, for example, add or remove data blocks. In a system using a data warehouse file, modified blocks are automatically updated in step 1206 when the data warehouse file is modified (because the modified blocks are shared between the data warehouse file and the other files on the storage device).

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method for restoring data to a storage controller, the method comprising:
receiving a backup image including file system metadata and a plurality of data blocks, wherein the file system metadata includes information defining a plurality of directories and information defining a plurality of data containers, the information defining a plurality of data containers including a listing of data blocks associated with individual data containers of the plurality of data containers;
copying the plurality of data blocks to the storage controller;
generating a data warehouse structure based on the file system metadata, wherein the data warehouse structure stores references to individual data blocks of the plurality of data blocks and wherein the references are indexed by an identifier determined based on the file system metadata;
generating a directory structure in a file system associated with the storage controller based on the file system metadata;
generating a plurality of empty data containers in the generated directory structure based on the file system metadata, wherein generating an empty data container includes generating a data structure and populating the data structure with metadata based on the file system metadata; and
populating data container contents of individual data containers of the plurality of empty data containers by associating individual data blocks of the plurality of data blocks with the individual data containers based on the data warehouse structure, wherein populating data container contents of an individual data container includes determining a volume block identifier associated with a data block in the individual data container from the file system metadata and copying a reference associated with the volume block identifier in the data warehouse structure into the data structure.

2. The method of claim 1, wherein generating the directory structure comprises:
reading first directory definition information associated with a first directory from the file system metadata, the first directory definition information including information specifying a second directory contained in the first directory;
directing an operating system associated with the storage controller to generate the first directory based on the first directory definition information;
reading second directory definition information associated with the second directory from the file system metadata; and
directing the operating system to generate the second directory as a subdirectory of the first directory based on the second directory definition information.

3. The method of claim 1, wherein the file system metadata defines a first data container and a second data container and wherein the listing of data blocks associated with the first data container and the listing of data blocks associated with the second data container include a shared data block.

4. The method of claim 1, wherein the file system metadata defines a first data container and a second data container and wherein the listing of data blocks associated with the first data container and the listing of data blocks associated with the second data container include a shared data block, and wherein populating data container contents of individual data containers comprises:
determining a shared volume block identifier associated with the shared data block;
copying a shared reference associated with the shared volume block identifier into a first data container structure associated with the first data container; and
copying the shared reference into a second data container structure associated with the second data container.

5. A storage server comprising:
a network interface through which to communicate with a backup client over a network;
a storage interface through which to access a backup storage facility;
a storage device;
a memory; and
a processor coupled to the network interface, the storage interface, and the memory, wherein the memory stores code, execution of which by the processor causes the storage server to perform a process which includes:
receiving a backup image through the storage interface, the backup image having a metadata portion and a data warehouse portion, wherein the metadata section includes information defining a plurality of directories and information defining a plurality of data containers, the information defining a plurality of data containers including a listing of data blocks associated with individual data containers of the plurality of data containers;
restoring a plurality of data blocks from the data warehouse portion of the backup image to the storage device;
generating a lookup structure based on the backup image, wherein the lookup structure maps identifiers to individual data blocks of the plurality of data blocks;
generating a directory structure in a file system associated with the storage server based on the metadata portion of the backup image;
generating a data container associated with a file system object defined by the metadata portion, wherein generating a data container includes generating a data structure and populating the data structure with metadata associated with the file system object; and
inserting a data block into the data container by associating the data block with the data container based on the lookup structure, wherein inserting a data block into the data container includes determining a volume block identifier associated with the data block from the metadata portion of the backup image and copying a reference associated with the volume block identifier in the lookup structure into the data structure.

6. The storage server of claim 5, wherein the storage interface comprises a data mover configured to receive data from a tape drive.

7. The storage server of claim 5, wherein generating the data container comprises generating a data structure containing metadata associated with the data container and not including references to data blocks associated with the data container.

8. The storage server of claim 5, wherein the lookup structure is a data warehouse structure created on the storage server, wherein the data warehouse structure stores references to individual data blocks received from the data portion of the backup image, and wherein the references are indexed by a volume block number determined based on the metadata portion of the backup image.

9. The storage server of claim 5, wherein generating the directory structure comprises:
reading multiple directory entries from the metadata portion of the backup image; and
generating a new directory for each directory entry of the multiple directory entries, wherein generating the new directory includes associating the new directory with a parent directory in the directory structure.

10. The storage server of claim 5, wherein the process further comprises:
receiving an updated backup image including an updated metadata portion and an updated data portion, wherein the updated backup image defines an incremental backup based on the backup image;
modifying the lookup structure based on the updated backup image; and
modifying the data container by adding or removing a data block from the data container based on the modified lookup structure.

11. The storage server of claim 5, wherein generating the lookup structure comprises:
generating a warehouse data container on the storage server;
reading multiple data blocks from the backup image;
for individual data blocks of the multiple data blocks, determining a block identifier; and
adding individual data blocks of the multiple data blocks to the warehouse data container, wherein the individual data blocks are added to the warehouse data container such that the associated block identifier is equal to a file block number associated with a position of the individual data block in the warehouse data container.

12. A system for restoring backup data to a storage device, the system comprising:
a storage interface configured to communicate with a storage facility to receive a backup image, wherein the backup image includes a metadata section and a storage data section having a plurality of storage units and wherein the metadata section includes information defining a plurality of directories and information defining a plurality of data containers, the information defining a plurality of data containers including a listing of data blocks associated with individual data containers of the plurality of data containers;
a storage subsystem;
a memory;
a processor;
a block management component configured to copy individual storage units of the plurality of storage units from the storage data section of the backup image to the storage subsystem;
a data warehouse generator component configured to generate a data warehouse lookup structure based on the backup image, wherein the data warehouse lookup structure provides an index mapping a storage unit identifier to an individual storage unit of the plurality of storage units;
a directory processor component configured to generate a restored directory and a restored data container in a file system associated with the storage subsystem based on the backup image, wherein the restored data container is a file system object containing only metadata information and wherein the restored data container is created in the restored directory; and
a data container populate component configured to associate a storage unit from the backup image with the restored data container by associating individual storage units of the plurality of storage units with the restored data container based on the data warehouse lookup structure, wherein associating individual storage units of the plurality of storage units with the restored data container includes determining a volume block identifier associated with a data block in the restored data container from the metadata section of the backup image and copying a reference associated with the volume block identifier in the data warehouse lookup structure into the restored data container.

13. The system of claim 12, wherein generating the restored data container comprises generating a data structure and populating the data structure with data container metadata based on the metadata section.

14. The system of claim 12, wherein the data warehouse lookup structure is a warehouse data container created in the storage subsystem and wherein the warehouse data container includes references to the plurality of data blocks.

15. The system of claim 12, wherein the directory processor component is further configured to:
read multiple directory entries from the metadata section of the backup image; and
generate a new directory for each directory entry of the multiple directory entries, wherein generating the new directory includes associating the new directory with a parent directory in the directory structure.

16. The system of claim 12, wherein the metadata section includes a first listing of data blocks associated with a first data container and a second listing of data blocks associated with a second data container, wherein the first listing and the second listing include a shared data block.

17. The system of claim 12, wherein the storage facility is a data mover receiving the backup image from a tape.

18. A system for restoring backup data to a storage device, the system comprising:
a memory;
a processor;
storage interface means for communicating with a storage facility to receive a backup image, wherein the backup image includes file system metadata and a data portion having a plurality of data blocks, wherein the file system metadata includes information defining a plurality of directories and information defining a plurality of data containers, the information defining a plurality of data containers including a listing of data blocks associated with individual data containers of the plurality of data containers;
restoring means for restoring individual data blocks of the plurality of data blocks from the data portion of the backup image to the storage device;
lookup generation means for generating a lookup data structure based on the backup image, wherein the lookup data structure defines a mapping from individual identifiers in the file system metadata to the individual data blocks of the plurality of data blocks;
directory means for generating a directory structure in a file system associated with the storage facility based on the file system metadata;
empty data container means for generating an empty data container on the storage facility based on the file system metadata, wherein the empty data container means includes data structure means for generating a data structure and populating the data structure with metadata based on the file system metadata; and data container populating means for populating the empty data container by associating individual data blocks of the plurality of data blocks with the empty data container based on the lookup data structure, wherein the data container populating means includes identifier determining means for determining a volume block identifier associated with a data block in the empty data container from the file system metadata and copying a reference associated with the volume block identifier in the lookup data structure into the data structure.

19. One or more computer-readable memories storing computer-executable instructions for implementing a method for restoring data to a storage server, comprising:

instructions for receiving a backup image through a storage interface, the backup image having a metadata portion and a data warehouse portion, wherein the metadata portion includes information defining a plurality of directories and information defining a plurality of data containers, the information defining a plurality of data containers including a listing of data blocks associated with individual data containers of the plurality of data containers:

instructions for restoring a plurality of data blocks from the data warehouse portion of the backup image to a storage subsystem associated with the storage server;

instructions for generating a lookup structure based on the metadata portion of the backup image, wherein the lookup structure maps identifiers to individual data blocks of the plurality of data blocks and wherein the identifiers are determined based on the metadata portion of the backup image;

instructions for generating a directory structure in a file system associated with the storage server based on the metadata portion of the backup image;

instructions for generating a plurality of empty data containers in the directory structure based on the metadata portion of the backup image, wherein generating the plurality of empty data containers includes generating a data structure and populating the data structure with metadata based on the metadata portion of the backup image; and instructions for populating data container contents of individual data containers of the plurality of empty data containers by associating individual data blocks of the plurality of data blocks with the individual data containers based on the lookup structure, wherein populating the data container contents of an individual data container includes determining a volume block identifier associated with a data block in the individual data container from the metadata portion of the backup image and copying a reference associated with the volume block identifier in the lookup structure into the data structure.

20. The one or more computer-readable memories of claim 19, wherein the lookup data structure is a data warehouse data container created in the file system associated with the storage server, wherein the warehouse data container stores references to individual data blocks of the plurality of data blocks, and wherein the references are indexed by a volume block number determined based on the metadata portion of the backup image.

21. The one or more computer-readable memories of claim 19, wherein instructions for generating a directory structure further comprises:

instructions for reading multiple directory entries from the metadata portion of the backup image; and instructions for generating a new directory for each directory entry of the multiple directory entries, wherein generating the new directory includes associating the new directory with a parent directory in the directory structure.

22. The one or more computer-readable memories of claim 19, wherein the backup image is stored on a sequential medium, the non-transitory computer-readable storage medium further comprising instructions to generate a metadata map structure based on the metadata portion of the backup image, the metadata map structure being accessible for random access.

23. The one or more computer-readable memories of claim 19, wherein the metadata portion of the backup image includes first data container information defining a first data container and second data container information defining a second data container, the first data container information including first data container metadata and a first listing of data blocks and the second data container information including second data container metadata and a second listing of data blocks, wherein the first listing and the second listing include a shared data block, wherein generating the plurality of empty data containers comprises generating a first empty data container based on the first data container information and generating a second empty data container based on the second data container information, and wherein populating data container contents comprises:

determining a shared reference associated with the shared data block;

copying the shared reference into the first empty data container; and copying the shared reference into the second empty data container.

24. The one or more computer-readable memories of claim 19, further comprising:

instructions for receiving an updated backup image including updated system metadata and a plurality of updated data blocks, wherein the updated backup image defines an incremental backup based on the backup image;

instructions for modifying the lookup data structure based on the updated metadata; and instructions for modifying the data container contents based on the modified lookup data structure.

25. The one or more computer-readable memories of claim 19, wherein instructions for generating a lookup data structure further comprises:

instructions for generating a warehouse data container on the storage server;

instructions for reading multiple data blocks from the backup image;

for individual data blocks of the multiple data blocks, instructions for determining a block identifier; and instructions for adding individual data blocks of the multiple data blocks to the warehouse data container, wherein the individual data blocks are added to the warehouse data container such that the associated block identifier is equal to a file block number associated with a position of the individual data block in the warehouse data container.

26. The one or more computer-readable memories of claim 19, wherein the backup image is received from a tape.

* * * * *

UNITED STATES PATENT AND TRADEMARK OFFICE
CERTIFICATE OF CORRECTION

| | | |
|---|---|---|
| PATENT NO. | : 8,504,529 B1 | Page 1 of 1 |
| APPLICATION NO. | : 12/488468 | |
| DATED | : August 6, 2013 | |
| INVENTOR(S) | : Ling Zheng et al. | |

It is certified that error appears in the above-identified patent and that said Letters Patent is hereby corrected as shown below:

In the Claims:

In column 21, line 24, in claim 19, delete "containers:" and insert -- containers; --, therefor.

Signed and Sealed this
Fourth Day of February, 2014

Michelle K. Lee
*Deputy Director of the United States Patent and Trademark Office*